United States Patent [19]

Erickson et al.

[11] 3,977,010

[45] Aug. 24, 1976

[54] DUAL SENSOR FOR MULTI-NOZZLE INK JET

[75] Inventors: Byron Ted Erickson; Howard Thorndike Hilton, both of San Jose, Calif.

[73] Assignee: International Business Machines Corporation, Armonk, N.Y.

[22] Filed: Dec. 22, 1975

[21] Appl. No.: 642,885

[52] U.S. Cl. .......... 346/75
[51] Int. Cl.[2] .......... G01D 15/18
[58] Field of Search .......... 346/75

[56] References Cited

UNITED STATES PATENTS

| | | | |
|---|---|---|---|
| 3,852,768 | 12/1974 | Carmichael et al. | 346/75 |
| 3,886,564 | 5/1975 | Naylor et al. | 346/75 |

OTHER PUBLICATIONS

Ruddy, G. A., Position and Synchronization Sensor For An Ink Jet Printer; IBM Tec. Disc. Bulletin, vol. 15, No. 9, Feb. 1973, pp. 2785–2786.

*Primary Examiner*—George H. Miller, Jr.
*Attorney, Agent, or Firm*—John H. Holcombe

[57] ABSTRACT

A dual antenna structure for inductive sensing of charged ink jet drops. The structure includes two sense rails or wires, each on an opposite side of a series of ink jet drop streams and perpendicular to the streams. Conductive shields are located on the fore and aft sides of each sense rail to shield the rail from all but a small portion of each drop stream path. A separate low impedance amplifier is connected to each sense rail and both are grounded in common to the shields. Using the sensor, various measurements may be made on a jet stream whose drops are charged, including jet alignment, drop arrival time for establishing velocity, charge electrode operation, and charge phasing.

6 Claims, 11 Drawing Figures

DUAL SENSOR FOR MULTI-NOZZLE INK JET

BACKGROUND OF THE INVENTION

In recent years, significant development work has been done in the field of ink jet printing. One type of ink jet printing involves electrostatic, pressurized ink jet, wherein conductive ink is applied under pressure to a suitable nozzle or nozzles. The ink is thus propelled from each nozzle in a stream which is caused to break up into a train of individual droplets which must be selectively charged and controllably deflected for recording or to a gutter. The droplet formation may be controlled and synchronized by a number of different methods available in the art including physical vibration of the nozzle, pressure perturbations introduced into the ink supply at the nozzle, etc. The result of applying such perturbations to the ink jet is to cause the jet stream emerging from the nozzle to break into uniform droplets at the perturbation frequency and at a predetermined distance from the nozzle. It is of utmost necessity in such systems to precisely synchronize the application of the appropriate charging signal to the ink droplet stream at the precise time of droplet formation and breakoff from the stream. Means for supplying the selected electrostatic charge to each droplet produced by the nozzle conventionally comprises a suitable charging circuit and an electrode surrounding or adjacent to the ink stream at the location where the stream begins to form such droplets. Charging signals are applied between a point of contact with the ink and the charging electrode. A drop will thus assume a charge determined by the amplitude of the particular signal on the charging electrode at the time that the drop breaks away from the jet stream. The drop thereafter passes through a fixed electric field and the amount of deflection is determined by the amplitude of the charge on the drop at the time it passes through the deflecting field. In the binary type of electrostatic ink jet, uncharged drops are not deflected and proceed directly to a recording surface positioned downstream from the deflecting means such that each such drop strikes the recording surface and forms a small spot. Charged drops are deflected by the deflecting means to a gutter. U.S. Pat. No. 3,373,437 of Richard G. Sweet et al entitled "Fluid Droplet Recorder with a Plurality of Jets" discloses such a recording or printing system.

The time that the drop separates from the fluid stream emerging from the nozzle is quite critical, since the charge carried by the droplet is produce at that moment by electrostatic induction. The field established by the charging signal is maintained during drop separation, and the drop will carry a charge determined by the instantaneous value of the signal at instead breakoff. Thus, the droplet breakoff time and the application of the charge signal must be very precisely synchronized.

In the binary type of system, if synchronization is not correct such that the charging signal is in the process of either rising or falling at the time of drop breakoff, the exact charge of the drop will be some time function of the maximum charge signal rather than being fully charged. Such drops may be deflected by an amount too small to cause impact with the gutter, but instread would impact the recording medium at an unintended position.

The binary type of system normally employs a series of small nozzle orifices in a single ink jet head. Although great care may be exercised in attaining precise parallel directionality of the jets, partial clogging or crusting of any nozzle orifice will alter the directionality, resulting in erroneous spot placement and attendant degradation of print quality.

With respect to the problem of obtaining proper synchronization between the charged signal and drop breakoff, the prior art definitely recognized the criticality of the synchronization problem and many sensors have been proposed for testing the drops for proper charging and to allow adjustment of the synchronization between the charging signals and the perturbation means. The following U.S. patents are representative of the prior art: Keur et al., U.S. Pat. No. 3,465,350; Keur et al., U.S. Pat. No. 3,465,351; Lovelady et al., U.S. Pat. No. 3,596,276; Robertson U.S. Pat. No. 3,761,941; Hill et al. U.S. Pat. No. 3,769,630; Julisburger et al. U.S. Pat. No. 3,769,632; Ghougasian et al. U.S. Pat. No. 3,836,912; Carmichael et al. U.S. Pat. No. 3,852,768; Meier U.S. Pat. No. 3,866,237; Naylor et al. U.S. Pat. No. 3,886,564; and Haskell U.S. Pat. No. 3,898,673.

The Keur et al, U.S. Pat. No. 3,465,350 describes the use of a piezoelectric member which generates a signal in response to drop impact. The Keur et al. U.S. Pat. No. 3,465,351, the Lovelady et al. patent, the Robertson patent and the Hill et al patent all disclose sensing electrodes where charged drops impacting the electrodes give up their charge thereto, which is sensed. The Meier patent and Haskell patent discloses the use of a segmented gutter having electrodes separated by a small gap to sense the resistance or conductance of the ink flowing at the gap. The Julisberger et al. patent, the Ghougasian et al. patent and the Carmichael et al patent all describe single shielded induction sense electrodes having an aperture through the shields for passage of an ink jet drop stream for induction sensing charged drops. The Charmichael et al. patent also discloses a shielded probe for placement adjacent an ink jet drop stream for induction sensing charged drops. The Naylor et al. patent describes an induction sensor comprising two plates lying in the same plane parallel to an ink jet drop stream and separated by a small gap to sense the plate by which the stream is passing or is closest.

All of the foregoing art is primarily directed to sensors for detecting a single drop stream and for sensing a single characteristic of that drop stream.

It is therefore an object of the present invention to provide a common antenna structure for a plurality of parallel drop streams adapted to be employed to sense a plurality of characteristics of each stream.

SUMMARY OF THE INVENTION

In accordance with the present invention, an antenna structure is provided for inductive sensing of charged ink jet drops issuing from a multi-nozzle ink jet head, the ink head producing a series of approximately parallel ink jet drop streams and selectively charging drops of selected streams. The antenna structure includes two sense rails or wires perpendicular to and on opposite sides of the series of ink jet drop streams. Conductive shields are provided on the fore and aft sides of each sense rail to shield the rail from all but a small portion of the drop path. A separate low impedance amplifier is connected to each sense rail and both are grounded in common to the shields to detect the signals induced by selectively charged drops from a selected drop stream.

The measurements that are made employing the detected signals include jet alignment which comprises comparing the induced current in one rail to that of the other. The arrival time of a drop is determined by the induced charge waveform in both rails compared to the shield. The drop charging operation and phasing are determined by the charge amplitude in both rails.

The foregoing and other objects, features and advantages of the invention will be apparent from the following, more particular description of a preferred embodiment of the invention as illustrated in the accompanying drawings.

DETAILED DESCRIPTION OF THE INVENTION

Figure 1:
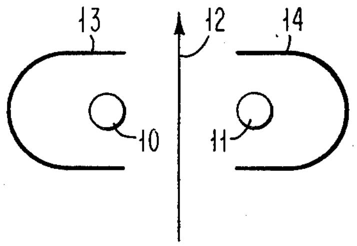
FIG. 1 is an end view of a dual antenna structure in accordance with the present invention.
Figure 2:
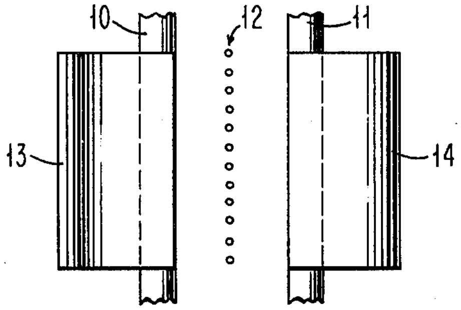
FIG. 2 is a front view of a dual antenna structure in accordance with the present invention.

In the previously described type of electrostatic pressure ink jet printing systems employing multiple jet streams, jet alignment and drop stream velocity are important measurements, possibly surpassing in importance the measurement of charge electrode operation and charge phasing or synchronization for which prior sensors were primarily adapted. Referring to FIGS. 1 and 2, two sense rails 10 and 11 are located in the same plane and separated by a constant distance so as to be on opposite sides of and perpendicular to each of an array of ink jet drop streams 12. As an example, the sense rails 10 and 11 are located equidistant from the normally aligned ink jet drop streams when the streams are undeflected.

Sense rails 10 and 11 are formed from an electrically conductive material in any shape which remains constant along the longitudinal dimension of the rails so long as the rails are adjacent the ink jet drop streams. The term "rail" is defined as referring to any rail, wire or plating which has the described constant sectional shape along its effective length.

The sense rails 10 and 11 are respectively surrounded by electrically conductive shields 13 and 14. The shields thus are located on the fore and aft sides of each of the sense rails to shield the rail from all but a small portion of each drop stream path in the array 12.

Figure 3:
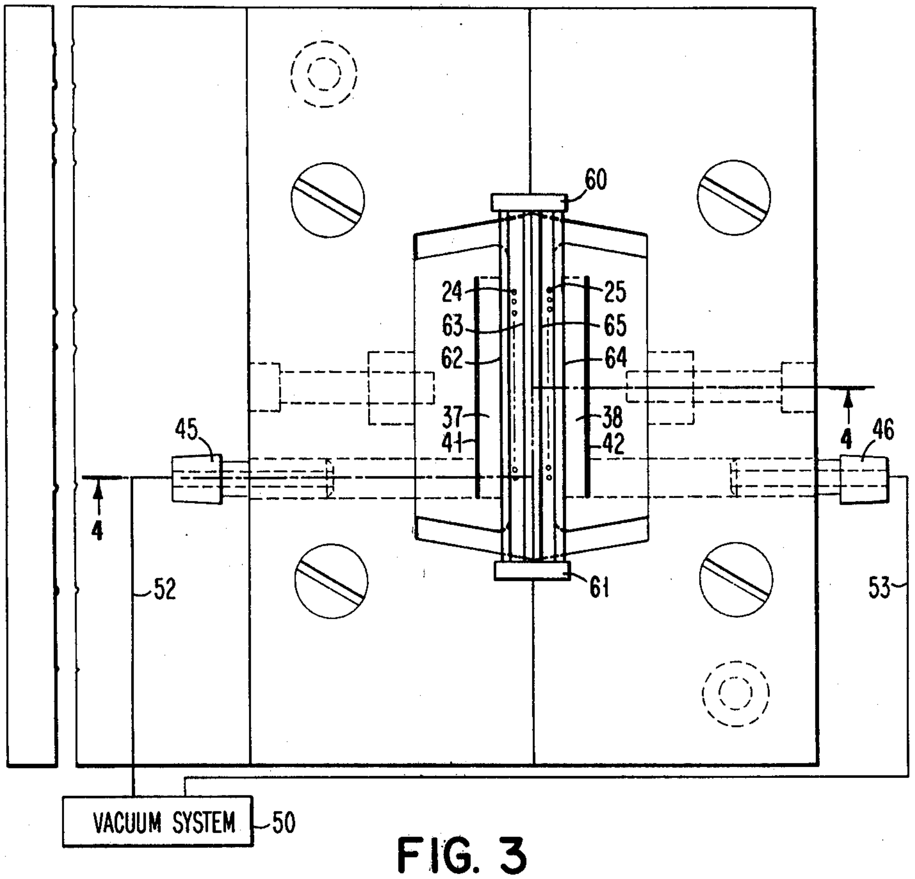
FIG. 3 is a front view of an ink jet head and deflection structure incorporating a dual antenna structure in accordance with the present invention.
Figure 4:
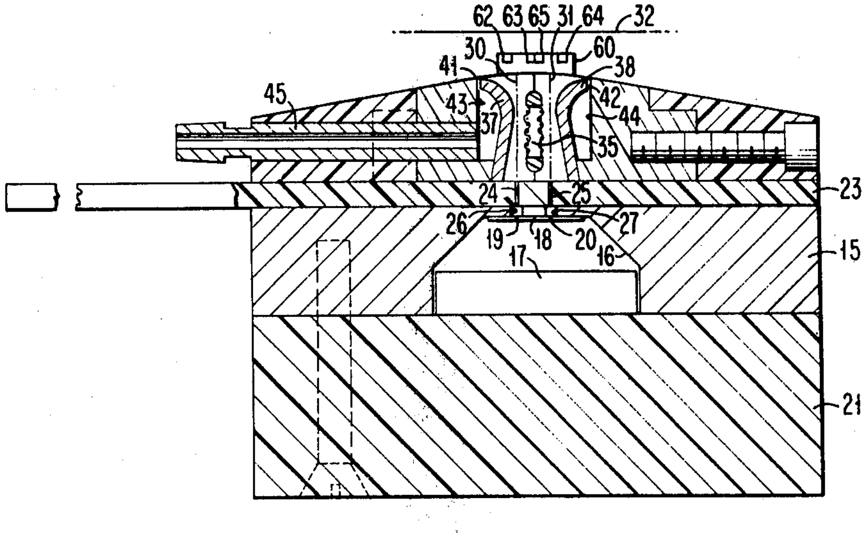
FIG. 4 is a cross-section view of the apparatus of FIG. 3.

FIGS. 3 and 4 illustrate an example of a two-row, multi-orifice, binary electrostatic ink jet head and deflection system. The ink jet head and deflection assembly of FIGS. 3 and 4 is essentially that of co-pending U.S. patent application Ser. No. 543,851, filed Jan. 24, 1975, W. L. Chocholaty, assigned in common with the present application. Briefly, the assembly includes a mounting block 15 having a manifold 16 formed therein. Mounted within the manifold are a piezoelectric crystal 17 and an orifice plate 18. The orifice plate includes two rows 19 and 20 of closely spaced ink jet orifices. The piezoelectric crystal 17 is mounted on a backing plate 21. A charge plate 23 is mounted on block 15 and is provided with two rows of charge electrodes 24 and 25, each charge electrode being aligned with a corresponding orifice of the orifice plate 18.

Pressurized ink is supplied to the manifold 16 and is ejected through orifices 19 and 20 of orifice plate 18. The piezoelectric crystal 17 is perturbed by an electrical signal to vary the internal volume of manifold 16. This perturbates the ink pressure, causing the ink jet streams emanating from orifices 19 and 20 to break into streams of uniform drops. The ink emanates from orifices 19 and 20 in the form of filaments passing through openings 26 and 27 with the perturbations increasing as the distance from the orifice plate 18 increases, until the drops break off from the filaments. Upon the breakoff occurring within the charge electrodes 24 and 25, the drops then assume a charge dependent upon the voltage applied to the corresponding charge electrode at the instant of drop breakoff.

Uncharged drops proceed along paths 30 and 31 to impact the recording medium 32. The high voltage deflection plate 35 is positioned intermediate the drop flow paths 30 and 31. Grounded deflection electrodes 37 and 38 are positioned respectively on the opposite sides of drop paths 30 and 31 from high voltage deflection electrode 35. Deflection electrodes 37 and 38 curve away from the drop paths and terminate in openings 41 and 42 which communicate with cavities 43 and 44. The cavities further communicate with tubes 45 and 46 which are connected to a vacuum source 50 by, respectively, lines 52 and 53.

Electrostatic fields established between electrode 35 and electrodes 37 and 38 thus causes charged drops to be deflected to contact respectively electrodes 37 and 38 from the normal uncharged drop paths 30 and 31. Electrodes 37 and 38 therefore also serve as gutters to intercept the drops which are deflected and not used for recording purposes. The intercepted drops flow to the ends of the respective electrodes and are drawn through the respective opening 41 or 42 into cavity 43 and 44 by the vacuum souce 50. Accumulated ink is drawn from cavity 43 or 44 through the respective tube 45 or 46 to the vacuum source 50. The ink may then be recycled for subsequent recording use.

Mounted on the ink jet head assembly are supports 60 and 61. The supports mount and locate sense rails 62 and 63 on opposite sides of the array of drop stream paths 30, and they support and locate sense rails 64 and 65 on opposite sides of the array of drop stream paths 31.

Figure 5:
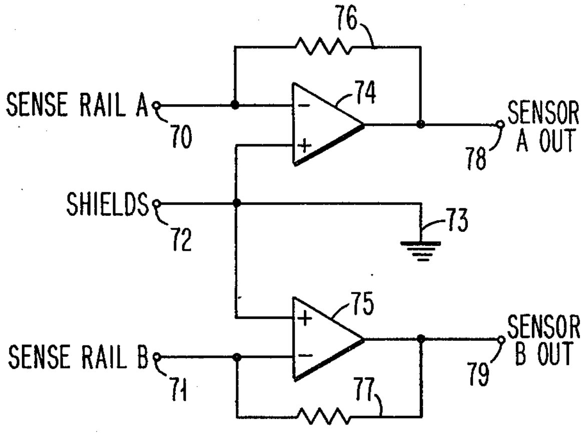
FIG. 5 is a diagram of the sense amplifiers in accordance with the present invention.

Referring to FIG. 5, a specific arrangement of preamplifiers is shown having an input 70 connected to one sense rail on one side of the array of ink jet streams, a second input 71 connected to the sense rail on the opposite side of the array of ink jet streams, and an input 72 connected in commmon to the shields of both the first and the second sense rails. Input 72 is grounded 73 and connected to the grounding input of both current amplifiers 74 and 75. These amplifiers are provided with the proper feedback impedance and are so arranged to provide a low impedance to the inputs to properly load the sense rails. The preamplified sensor outputs are supplied at output terminals 78 and 79.

Figure 6:
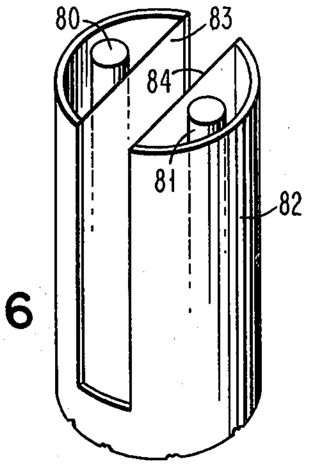
FIG. 6 is a perspective view of an alternate arrangement of a dual antenna apparatus in accordance with the present invention.

FIG. 6 illustrates an alternative embodiment of the sense rails of FIGS. 1 and 2. Sense rails 80 and 81 are suitably located within and on opposite sides of a slotted tube 82 and embedded in insulators 83 and 84. In this arrangement, the slotted tube is made of an electrically conductive material and forms the shielding for both sense rails, both shields being connected in common in that they are formed from the same tube.

Figure 7:
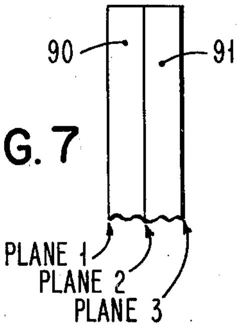
FIG. 7 is an end view of an alternative arrangement of the dual sense electrode structure in accordance with the present invention.
Figure 8:
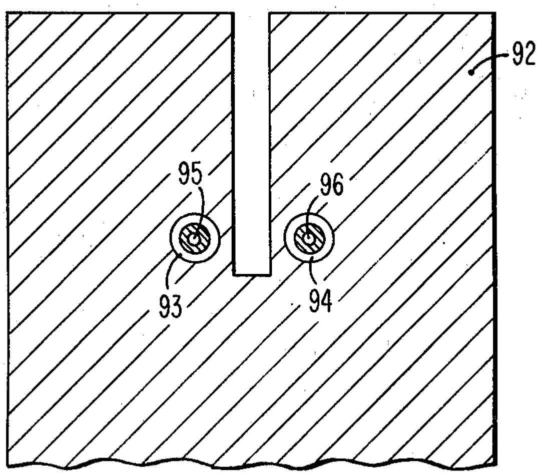
FIGS. 8 and 9 comprise planar views of designated planes of apparatus of FIG. 7.
Figure 9:
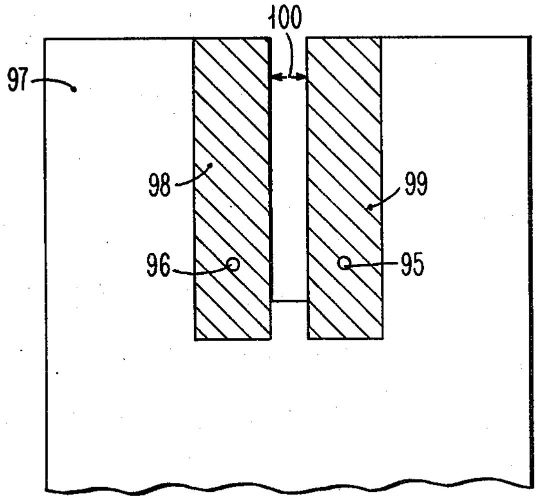

Referring to FIGS. 7–9, another alternative embodiment is illustrated comprising a series of laminations. As one example, the laminations may comprise two suitably plated ceramic plates 90 and 91. The outer surfaces of plates 90 and 91, comprising planes 1 and 3 of FIG. 7, are shown in FIG. 8. These surfaces are covered by a plating 92 of electrically conductive material, having etched or cleaned areas 93 and 94 separating the copper plating from the throughhole plating surrounding and extending through the holes 95 anad 96 in ceramic boards 90 and 91. Plane 2 in FIG. 7 is illustrated in FIG. 9 and may comprise the interior surface of either board 90 or 91 or both. The surface of the board 97 is plated with two electrically conductive plated coatings 98 and 99 which are electrically separate and noncontacting and which are similarly separate and out of contact with the surface 92 on the opposite side of the card. The throughhole plating in holes 95, 96 extend through the card and contact, respectively, the coatings 98 and 99.

In the resultant laminate structure, conductors 98 and 99 become the respective sense rails separated by gap 100 within which are located an array of parallel drop stream paths. Surfaces 92 on boards 90 and 91 thus become the outer shields from the sense rails. Holes 95 and 96 are the means for connecting the sense rails to the preamplifiers of FIG. 5.

Figure 10:
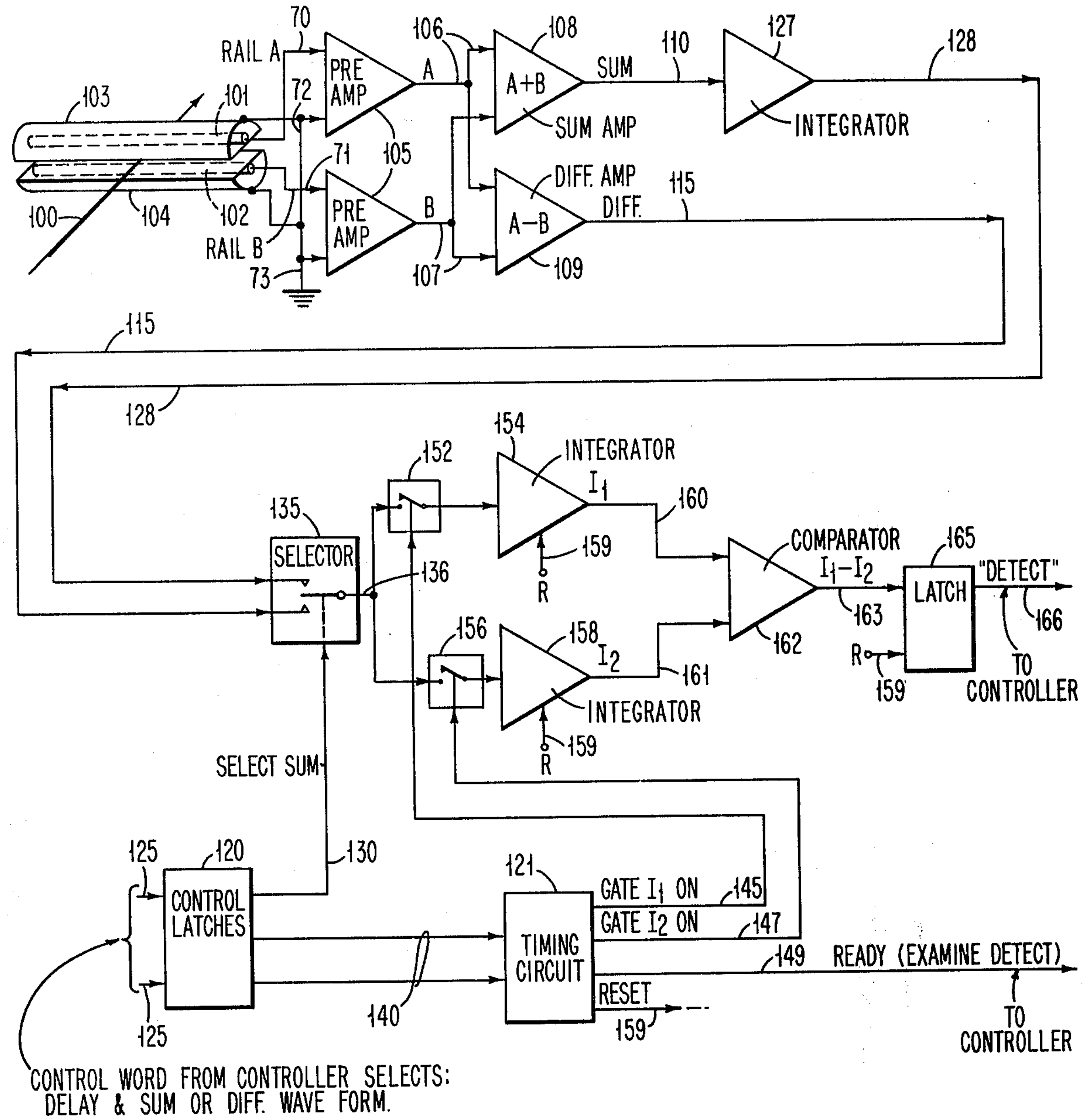
FIG. 10 comprises a diagram of exemplary detection circuitry constructed in accordance with the invention.
Figure 11:
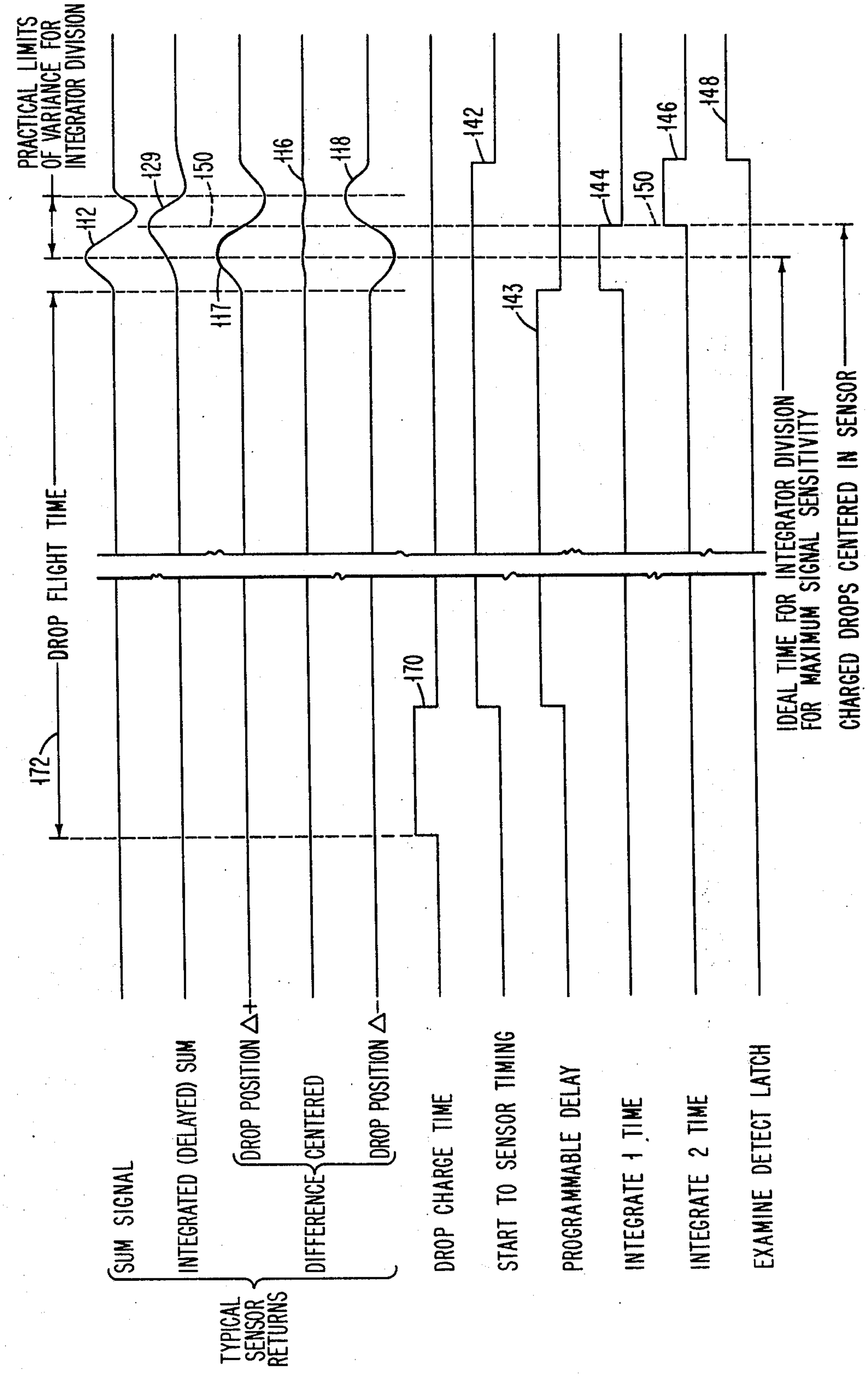
FIG. 11 comprises a series of waveforms illustrating pulses and signals of the disclosed embodiment of the invention including the circuitry of FIG. 10.

The FIG. 10 diagram illustrates the detection circuitry for the sensor of the present invention. The drop stream 100 is illustrated diagrammatically, as are sense rails 101 and 102 and shields 103 and 104. The sense rails are connected to the preamps 105 that are illustrated in detail in FIG. 5. The outputs of the preamps are supplied on lines 106 and 107 to mixing amplifiers 108 and 109. Many of the pulse signals and waveforms of the circuitry of FIG. 10 are illustrated in FIG. 11.

Amplifier 108 adds the current signal outputs of the sensor appearing on lines 106 and 107 and provides the resultant voltage signal on output line 110. An example of this signal is illustrated as waveform 112 in FIG. 11.

Waveform 112 is the signal resulting from passage of a burst of charged drops 110 through the sensor 101–104, where the total length of the burst is no longer than the distance between opposite sides of the shield, i.e., the diameter of tube 82 in FIG. 6 or the distance between planes 1 and 3 of FIG. 7. Waveform 112 is thus approximately the same as that provided by each individual sense rail, but is twice the amplitude, assuming that the drop stream is properly aligned. A more detailed explanation of the charge induced on a sense electrode and the resultant current produced by the passage of charged drops past a shielded induction sensor is described in FIG. 6 of U.S. Pat. No. 3,836,912, Ghougasian et al, discussed above.

Assuming that the drop stream is not properly aligned, the output of summing amplifier 108 on line 110 would remain approximately the same because the induced charge at one sense rail would be offset by the increased charge at the other sense rail.

This is not the case with the output of difference amplifier 109 on line 115, however. Assuming a proper alignment of the drop stream, the resultant output of amplifier 109 would be nil, as shown by curve 116. Upon there being any misalignment of the jet, amplifier 109 produces a difference voltage signal having a waveform dependent upon which sensor it is nearer. In FIG. 11, waveform 117 represents an exemplary output of amplifier 109 when the drop stream is positioned nearer sense element A, and waveform 118 represents an exemplary output of amplifier 109 when the drop stream is positioned nearer sense element B. In either case, the resultant difference signal increases as the misalignment increases.

Usage of the sum and difference information on lines 110 and 115 is dependent upon the operation of control latches 120 and timing circuit 121. The control latches 120 are responsive to the output of a controller digital interface provided on output cable 125. This output is in the form of a 16-bit digital word which designates the programmable delay, selects the sum or difference waveform, and provides a start signal.

The sum signal 112 on line 110 represents current flow into the sense rails. An integrator 127 is provided to convert that signal into one representing the induced charge on the rails. Thus, the integration produces on line 128 an integrated sum signal 129. Further, this integration provides timing alignment between the sum signal 129 and the difference signal 116, 117 or 118. Signal 129 is therefore also named the delayed sum.

Referring to the line latches 120, latch output line 130 is the select sum output line and is connected to selector 135. A signal on line 130 operates selector 135 to connect line 128 to output line 136, and the absence of a signal causes selector 135 to connect ine 115 to output line 136. The remaining latch output lines in cable 140 supply the digital programmable delay signal to timing circuit 121. The timing circuit is responsive to a start signal from the controller interface comprising a bit on cable 125, which is transmitted by control latches 120 on cable 140 as signal 142. The timing circuit response comprises running the programmable delay 143 and then providing the Integrate 1 signal 144 on line 145, followed by the Integrate 2 signal 146 on line 147, and lastly the Ready signal 148 on line 149.

The programmable delay is set at the proper value as indicated by prior measurements so that Integrate 1 time 144 drops and Integrate 2 time 146 starts at what would be the midpoint of delayed sum signal 129 as shown by dotted line 150. Timing circuit 121 may, for example, comprise a counter to run the programmable delay.

The Integrate 1 signal 144 on line 145 operates logic switch 152 to supply the output of selector 135 to integrator 154. Similarly, the Integrate 2 signal 146 on line 147 operates logic switch 156 to supply the output of selector 135 to integrator 158.

Integrator 154 thus integrates the output of selector 135 until the time 150 and integrator 158 integrates the output of selector 135 after time 150.

Timing cirucit 151 further includes a reset output 159 which is employed for resetting or zeroing various circuits during the programmable delay 143. The reset output 159 is connected as shown to integrators 154 and 158 to clamp them to provide a zero start at the end of the programmable delay.

The integrators 154 and 158 can integrate signals of one polarity only. Thus, capacitors are included at the inputs thereto to bias the input signals to one polarity. The area of each supplied input signal is integrated by each respective integrator and the output voltage respresenting the integral is held until reset by a signal on line 159.

The outputs of integrators 154 and 158 are supplied, respectively, on lines 160 and 161 to comparator 162. Comparator 162 compares the two input signals and supplies a binary output representing the sign but not the value, of the instantaneous difference of the signal on line 160 less the signal on line 161, or $I_1 - I_2$.

The binary difference signal thus continually indicates by its state whether $I_1$ is greater than $I_2$ or whether $I_2$ is greater than $I_1$. When both integrals remain about equal, although both are increasing equally, the binary difference signal may switch between the two binary states.

The difference signal is supplied on line 163 to latch 165. The latch is designed to provide no output signal on line 166 so long as $I_1 - I_2$ on line 163 is indicating that $I_1$ is greater, but to provide an output signal on line 166 as soon as $I_1 - I_2$ indicates that $I_2$ is greater. Latch 165 is arranged to hold any output signal until reset by the reset signal on line 159 during the subsequent programmable delay. The latch output thus clearly overlaps the Ready signal 148 by a substantial time period.

Both line 166 and line 149 are connected to the controller digital interface, Ready signal 148 indicating that the circuitry has operated and line 166 is indicating the status of the measurement made.

The primary measurements made are of flight time, using delayed sum signal 129, and of stream alignment, using difference signal 116, 117 or 118. The specific technique for multi-jet arrangements is to cause termination of the deflection field by removal of the voltage on the high voltage deflection, electrode, i.e., electrode 35 in FIGS. 3 and 4. During a test cycle with the deflection voltage removed, all drops, whether charged or not, do not impact a gutter and continue on to impact the recording medium 32. Thus, an alternative arrangement is to employ a "service" station off to one side of the recording medium with an auxiliary sump to catch all the drops. During the test cycle, the head is moved to the service station and the testing is conducted.

For testing, a charge signal 170 is supplied to the charge electrode 24, 25 of the selected jet to charge a group of drops of the stream. The group of charged drops thus remain undeflected due to the absence of the deflection field and continue along the same path as the uncharged drops of the same stream. The controller also provides the control word on cable 125 to operate control latches 120 to select 135 the sum (flight time) measurement by a signal on line 130, or select the difference (alignment) measurement by lack of a signal on line 130. The controller further operates control latches 120 to set timing circuit 121 with the desired programmable delay and provides the start signal 142.

The programmable delay 143 is equal to the expected drop flight time 172 less the time of drop charge time 170. At the end of the drop flight time, the first of the charged drops is initially sensed by sensor 101, 102 and preamplified 105. The preamplified current signals of the first and subsequent charged drops from the sensor are supplied to sum circuit 108 and to difference circuit 109. The resultant sum signal 112 on line 110 is converted by integrator 127 and aligned with the difference signal to provide signal 129 to selector 135. The resultant difference signal 116, 117 or 118 is supplied on line 115 to selector 135.

Assume first that the signal on line 130 operates selector 135 to transmit the sum signal 112 to logic switches 152 and 156. Upon completion of the programmable delay, timing circuit 121 provides the Integrate 1 signal 144 to operate logic switch 152 to supply the sum signal to integrator 154. The integrator integrates the area under the sum curve until the input is terminated at time 150. The integral value is thus supplied on line 160 to comparator 162 which provides the integral value to latch 165. At time 150, timing circuit 150 terminates the Integrate 1 signal 144 and supplies the Integrate 2 signal 146 on line 147 to operate logic switch 156. The logic switch then supplies the sum signal 129 to integrator 158 which integrates the sum signal after time 150. So long as the integral from circuit 158 is less than that from circuit 159, the output from comparator 162 remains positive. However, upon the integral from circuit 158 becoming greater, the output from comparator goes negative, operating latch 165.

Flight time is the inverse of the stream velocity. Thus, if the velocity of the jet stream is correct so that time 150 is at the center of delayed sum signal 129, latch 165 will be operated in about 50% of the measurement cycles out of a series. However, if it is not operated for a large percentage of the series, the burst of charged drops is arriving sooner than expected to indicate that the stream velocity is too high. Similarly, if latch 165 is operated in a high percentage of the series, the burst of drops is arriving later than expected to indicate that the stream velocity is too low.

Ready signal 148 indicates to the controller that latch 165 is in condition to be tested at line 166 to the controller.

Assume next that the lack of a signal on line 130 operates selector 135 to transmit the difference signal 116, 117, or 118 to logic switches 152 and 156. At Integrate 1 time 144, logic switch 152 supplies the first part of the difference signal to integrator 154. Then, after time 150, the timing circuit 121 supplies the Integrate 2 signal 146 to operate logic switch 154 to supply the second part of the difference signal to integrator 158.

If the stream is properly aligned, integrators 154 and 158 respond to signal 116 by providing equal output signals to comparator 162. The comparator output will therefore be positive some of the time and negative some of the time, operating latch 165 in about 50% of the measurement cycles for examination by the controller upon receipt of the Ready signal 148.

If the jet stream is misaligned, the difference signals 117 or 118 are substantial, and integrators 154 and 158 produce substantially different output levels. Comparator 162 therefore produces an output signal on line 163 having a binary state determined by the polarity of the initial portion of the difference signal. Thus, the output signal on line 163 consistently is in the "$I_1$ greater" state and does not operate latch 165 if the stream is closer to rail 101, producing difference signal 117. Similarly, the output signal on line 163 consistently is in the "$I_2$ greater" state and operates latch 165 if the stream is closer to rail 102, producing difference signal 118.

Continued testing and detection by the controller in response to the ready signal of latch 165 as consistently operated or not operated thus indicates that the ink jet stream is misaligned and indicates the direction of misalignment.

The outputs 160 and 161 may further be connected to meters or to analog to digital converters to indicate the amount of misalignment when the selector 135 is connected to line 115. When the selector is connected to line 128, the meters of ADC's indicate drop charge level. This could be used as an indication of charge electrode failure, or an indication of improper synchronization if the charge signal does not remain on for the burst, but is separately provided for each drop.

The described arrangement may also be utilized to establish the proper programmable delay for initializing the timing of dotted line 150 for subsequent measurements. Specifically, the programmable delay may be set at an arbitrary value based upon an estimated flight time. At the termination of the programmable delay, the Integrate 1 signal is applied to gate integrator 154 for the preset time only, and immediately thereafter the Integrate 2 signal is applied to gate integrator 158. However, by means of a special binary bit in the control word, the Integrate 2 signal is prevented from timing out. The controller monitors output 166 from latch 165 counting until the latch is tripped, signalling that $I_2$ passes $I_1$ in value. The value of the counter is read at this time if $I_2$ ultimately exceeded $I_1$. If the count time is shorter than the Integrate 1 time, the programmable delay is too short. If the count time is longer than the Integrate 1 time, or if $I_2$ never exceeds $I_1$ in value during the test, the programmable delay is too long. Further, the difference between the count time and the Integrate 1 time allows an estimate to be made of the required change to properly adjust the programmable delay. Thus, the programmable delay may be quickly adjusted to the proper value, requiring only a few test scans. The resultant programmable delay time may be utilized to determine the actual drop flight time.

The resultant program delay is then employed as the base value for the specific jet for determining whether the stream flight time, and hence, velocity, remains at the initial value. The flight time may be adjusted for all jets by adjusting the pressure of the ink or by adjusting the viscosity of the ink. Thus, the flight time will be adjusted in one of these ways only when the group flight time goes above or below specified limits, the flight times being measured as defined above.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an electrostatic, pressurized ink jet system having a plurality of nozzles arranged in a row and projecting generally parallel ink streams in a predetermined direction, each of which breaks up into a stream of drops continuing in said direction, and having charge means for selectively applying an electrical charge to individual drops upon breakoff from each said stream, the improvement comprising:

two elongate electrically conductive sensing means disposed respectively on opposite sides of said drop streams, generally parallel to said row, and perpendicular to said streams;

electrically conductive shielding means disposed at least fore and aft of each said sensing means with respect to said direction of said drop streams, and closely spaced from and parallel to said sensing means; and separate low impedance current amplification means connected to each said sensing means and grounded in common to said shielding means for amplifying current signals of said respective sensing means.

2. The apparatus of claim 1 wherein:

said sensing means each responds to the passage of charged drops therebetween by inducing a current flow to said low impedance current amplification means, and said apparatus additionally includes summing means connected to said amplification means for summing said respective current signals to generate a sum signal to indicate thereby the arrival time of said charged drops at said sensing means.

3. The apparatus of claim 1 wherein:

said sensing means each responds to the passage of charged drops therebetween by inducing a current flow to said low impedance current amplification means, and said apparatus additionally includes difference means connected to said amplification means for subtracting said respective current signals to generate a difference signal to indicate thereby any misalignment of said charged drops with respect to a midpoint between said sensing means.

4. The apparatus of claim 1 wherein said two sensing means additionally each comprises sense rails of uniform cross section along the length thereof adjacent said drop streams.

5. The apparatus of claim 4:

additionally including two laminar dielectric plates having openings therethrough for passage of said ink drop streams; and wherein:

said sense rails additionally comprise laminar conductive plates on a plane disposed between said two dielectric plates on opposite sides of said openings; and said shielding means additionally comprise laminar conductive plates disposed on the two surfaces of said dielectric plates opposite said plane and on opposite sides of said openings.

6. The apparatus of claim 4 wherein:

said shielding means additionally comprises a single electrically conductive tubular member having openings there-through laterally with respect to the axis thereof for passage of said ink drop streams; and said sense rails additionally are disposed within said tubular member on opposite sides of said openings; and additionally including a dielectric disposed within said tubular member for supporting and positioning said sense rails and insulating said sense rails from said tubular member.

* * * * *